UNITED STATES PATENT OFFICE.

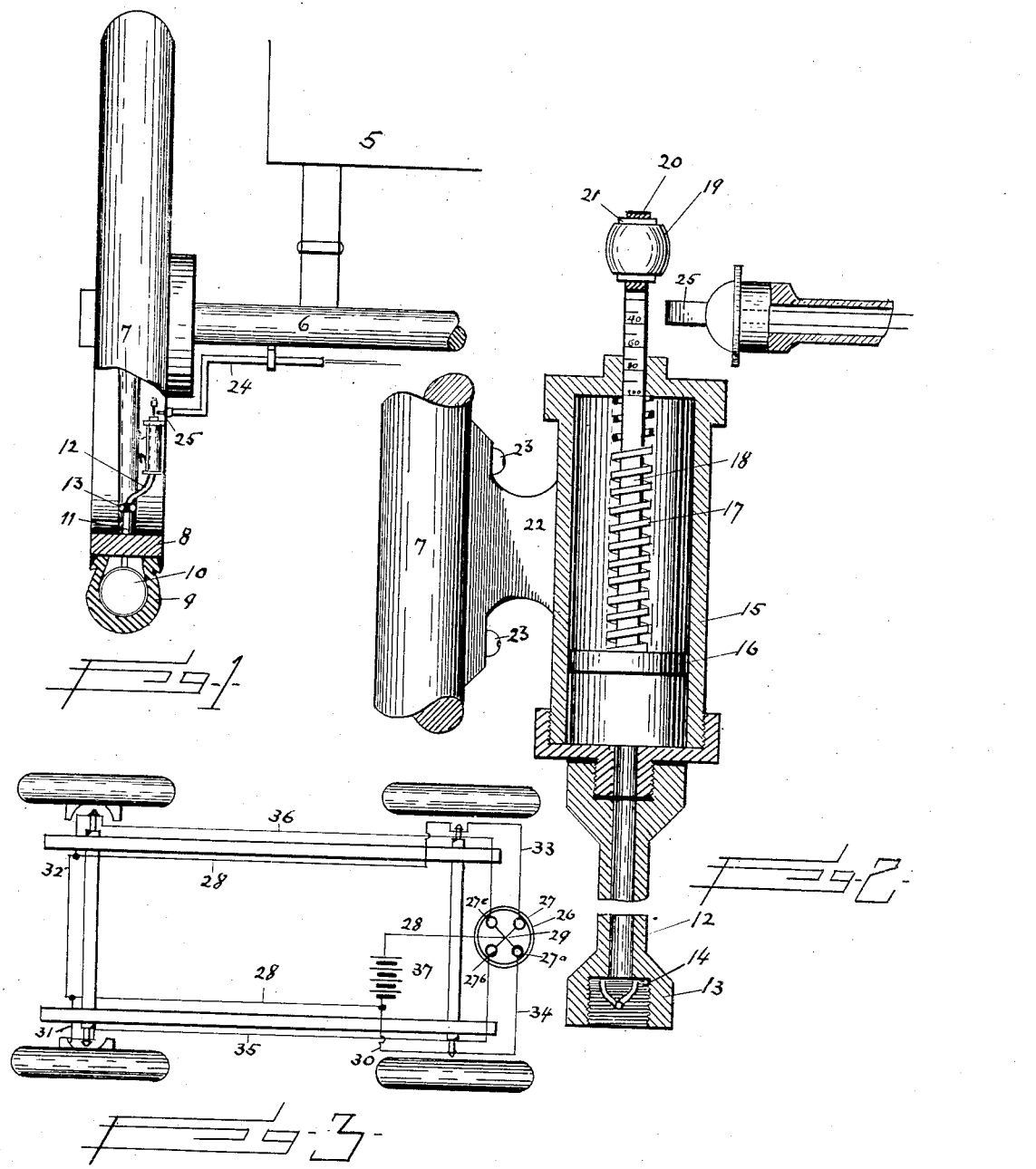

HARRY C. QUICK, OF OAKLAND, CALIFORNIA, ASSIGNOR TO HARRY S. STEWART, OF SAN FRANCISCO, CALIFORNIA.

DEFLATED-TIRE DETECTOR.

1,115,022.  Specification of Letters Patent.  Patented Oct. 27, 1914.

Application filed March 21, 1914. Serial No. 826,399.

*To all whom it may concern:*

Be it known that I, HARRY C. QUICK, a citizen of the United States, residing at Oakland, in the county of Alameda and State of California, have invented certain new and useful Improvements in Deflated-Tire Detectors, of which the following is a specification.

This invention relates to a tire deflation signal intended primarily for use in connection with pneumatic tires ordinarily employed upon motor vehicles.

The object of the invention is to provide an improved device of this character constructed in such manner as to indicate to the driver of the vehicle, through the medium of a signal upon the dash board, the fact that a tire has become deflated by reason of the escape of the air therefrom; and to not only indicate this fact, but to indicate to the driver which of the tires is deflated and affected.

Further objects and advantages of the invention will be set forth in the detailed description which now follows.

In the acompanying drawing, Figure 1 is a view partly in rear elevation and partly in section of the left hand rear wheel of a motor vehicle, Fig. 2 is a sectional view of a circuit closing attachment; and Fig. 3 is a diagrammatic view illustrating the circuits.

Like numerals designate corresponding parts in all of the figures of the drawing.

Referring to the drawing, the numeral 5 designates the body of a motor vehicle supported upon axle 6 and provided with the usual wheels comprising spokes 7, rim 8, outer casing 9 and inner tube 10. Connected to the inflation valve stem 11 is a flexible tube 12 having at its lower end a threaded socket 13 carrying a spider 14 for depressing the valve to permit the passage of the air contained within the tire to the interior of cylinder 15 where the air acts against a plunger 16 having an air-tight fitting within said cylinder. This action of the air against said plunger forces the latter upwardly against the tension of a spring 17. This spring surrounds a stem 18 by which the plunger is carried. This stem passes through the upper end of the cylinder and has mounted thereon, a roller 19 held in place by a nut 20 and washer 21. The cylinder 15 is carried by a bracket 22 secured by screws or like fastening devices 23, to one of the spokes 7. It will therefore be seen that the structure so far described rotates bodily with the wheel.

Secured to the under side of the axle 6 and extending longitudinally thereof is a pipe 24 within the mouth of which is disposed a push button 25 of the ordinary construction. This pipe is for the purpose of receiving the current carrying wires hereinafter described.

When the tire is inflated to the proper extent, the action of the air against plunger 16 forces the stem 18 and the roller 19 to a position where the roller lies above the push button, but if by reason of the escape of air from the tire, said tire becomes deflated and the pressure of the air therein is materially reduced, the spring 17 acts to force the plunger downwardly and brings the roller 19 to such a position that as the wheel rotates, this roller is caused to ride over the push button and press the same inwardly to close an electric circuit in the manner common to devices of this nature.

It will be readily understood that the elements above described are duplicated at each of the wheels and the manner of connecting the circuits is illustrated in Fig. 3. In this figure, 26 designates a casing adapted to be disposed upon the dash board of the vehicle and containing four signaling elements, such for instance as incandescent lamps 27, 27ª, 27ᵇ, and 27ᶜ. A common conductor 28 is connected to one side of all of these lamps through the cross wires 29. One side of the push button of the right hand front wheel is connected by a branch conductor 30 with conductor 28. A branch conductor 31 connects one side of the right hand rear push button with conductor 28. A branch conductor 32 connects one side of the rear left hand push button with conductor 28, while the terminal end of conductor 28 is connected to one side of the left hand front push button. A conductor 33 connects the other side of this latter push button with the corresponding lamp 27. A conductor 34 connects the opposite side of the right hand front push button with the remaining side of the corresponding lamp 27ª. A conductor 35 connects the remaining side of the right hand rear push button with the remaining side of lamp 27ᵇ and a conductor 36 connects the left hand rear push button with the remaining side of lamp 27ᶜ. A battery 37 or other source of energy is disposed within the conductor 28. It will therefore be seen that if the right hand rear tire becomes deflated, the circuit will be completed as follows: from one side of the push button through conductors 31 and 28 and the battery to the crosswires 29 back to lamp 27$^b$ and through conductor 35 to the opposite side of the push button which is in closed position. The remaining circuits are completed in a like manner through their several respective conductors.

The structure described will prove of great benefit to the owners and drivers of motor vehicles for the reason that it will quickly show that a tire has become deflated. This is important because if a tire is run deflated for any considerable distance, the fabric of the tire casing becomes cracked and ruptured in such manner that "blow outs" are likely to follow. Furthermore, when the tire is run deflated, the casing rapidly "rim cuts" and if the tire is completely deflated without the knowledge of the driver, the inner tube soon becomes chewed to pieces.

This structure is particularly advantageous because of the fact that it is so arranged that it may be readily attached to tires already in use. It is only necessary to screw the coupling 13 upon the valve stem to have the new structure connected to the old. The stem 18 may, if desired, be provided with indicating figures, so that the driver may, by inspection of these figures, determine the pressure within any of the tires at any time.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. In a device of the character described, the combination with a vehicle and its pneumatic tires, of a cylinder, an air tight plunger fitted in said cylinder, means for connecting said cylinder to the inflation valve stem of the tire, a stem connected to said plunger, spring means resisting the movement of said plunger, a push button disposed in the path of movement of said plunger, an electric circuit controlled by said push button, and a signal in said circuit.

2. In a device of the character described, the combination with a cylinder, an air-tight plunger fitted therein, spring means resisting the movement of said plunger, means for securing said cylinder to the spoke of a wheel, a conducting pipe leading from said cylinder to the inflation valve, means for connecting said pipe to said inflation valve, and means for automatically depressing the valve to permit the passage of air through said tube to the cylinder when said tube is secured in place.

3. In a device of the character described, the combination with a cylinder, of means for securing said cylinder to the spoke of a wheel, an air-tight plunger fitted in said cylinder, spring means resisting the movement of the plunger, a stem carried by said plunger, a roller carried by said stem, a tube leading from the bottom of said cylinder, and a valve depressing spider carried by said tube.

4. In a device of the character described, the combination with a cylinder, of means for securing said cylinder to the spoke of a wheel, an air-tight plunger fitted in said cylinder, spring means resisting the movement of said plunger, a stem carried by said plunger, a roller carried by said stem, a tube leading from the bottom of said cylinder, a valve depressing spider carried by said tube, and a laterally movable push button disposed within the path of said roller.

5. In a device of the character described, the combination with a cylinder, of means for securing said cylinder to the spoke of the wheel, an air-tight plunger fitted in said cylinder, spring means resisting the movement of said plunger, a stem carried by said plunger, a roller carried by said stem, a tube leading from the bottom of said cylinder, a valve depressing spider carried by said tube, a wire receiving pipe, and a laterally movable push button disposed within the mouth of said pipe and supported thereby, said push button being disposed in the path of movement of said roller, radial movement of said roller imparting lateral movement to said push button.

In testimony whereof I have affixed my signature in presence of two witnesses.

HARRY C. QUICK.

Witnesses:
F. T. R. PRENTISS,
A. G. McKERROD.